United States Patent [19]

Noll

[11] 3,747,957
[45] July 24, 1973

[54] CRANE BOOM LOAD TRANSFER DOLLY

[75] Inventor: George C. Noll, North Ridgeville, Ohio

[73] Assignee: Koehring Company, Milwaukee, Wis.

[22] Filed: Apr. 29, 1971

[21] Appl. No.: 138,524

[52] U.S. Cl.......................... 280/404, 182/2, 212/59
[51] Int. Cl............................................. B62d 53/04
[58] Field of Search............. 280/404, 423 R, 81 R, 280/62, 63, 400; 212/59, 144; 182/2; 52/143

[56] References Cited
UNITED STATES PATENTS

| 506,411 | 10/1893 | Bennett | 182/127 |
|---|---|---|---|
| 2,880,827 | 4/1959 | Gilmore | 280/404 |
| 3,224,597 | 12/1965 | Whitmire | 280/404 X |
| 1,513,717 | 10/1924 | Mills | 280/475 |

Primary Examiner—Leo Friaglia
Attorney—Andrew J. Beck

[57] ABSTRACT

A vehicle for supporting and transporting a crane having a boom element extending therefrom and a boom load transfer dolly. The boom load transfer dolly is a single axle, wheeled frame structure having two lever arm, load transmitting sections respectively adapted to engage a tractor portion of the vehicle and the extended boom element in load transmitting relationship. The lever arms of the transfer dolly may be generally pyramidical truss sections one of which may be releasably connected to the tractor for permitting horizontal pivoting of the dolly relative to the tractor. The other section includes a generally U-shaped saddle member which supports the boom in sliding relationship therewith. The saddle is in turn connected for pivotal movement with respect to the transfer dolly.

13 Claims, 6 Drawing Figures

PATENTED JUL 24 1973 3,747,957

INVENTOR
GEORGE C. NOLL

BY ANDREW J. BECK, CHARLES W. WALTON

ATTORNEYS

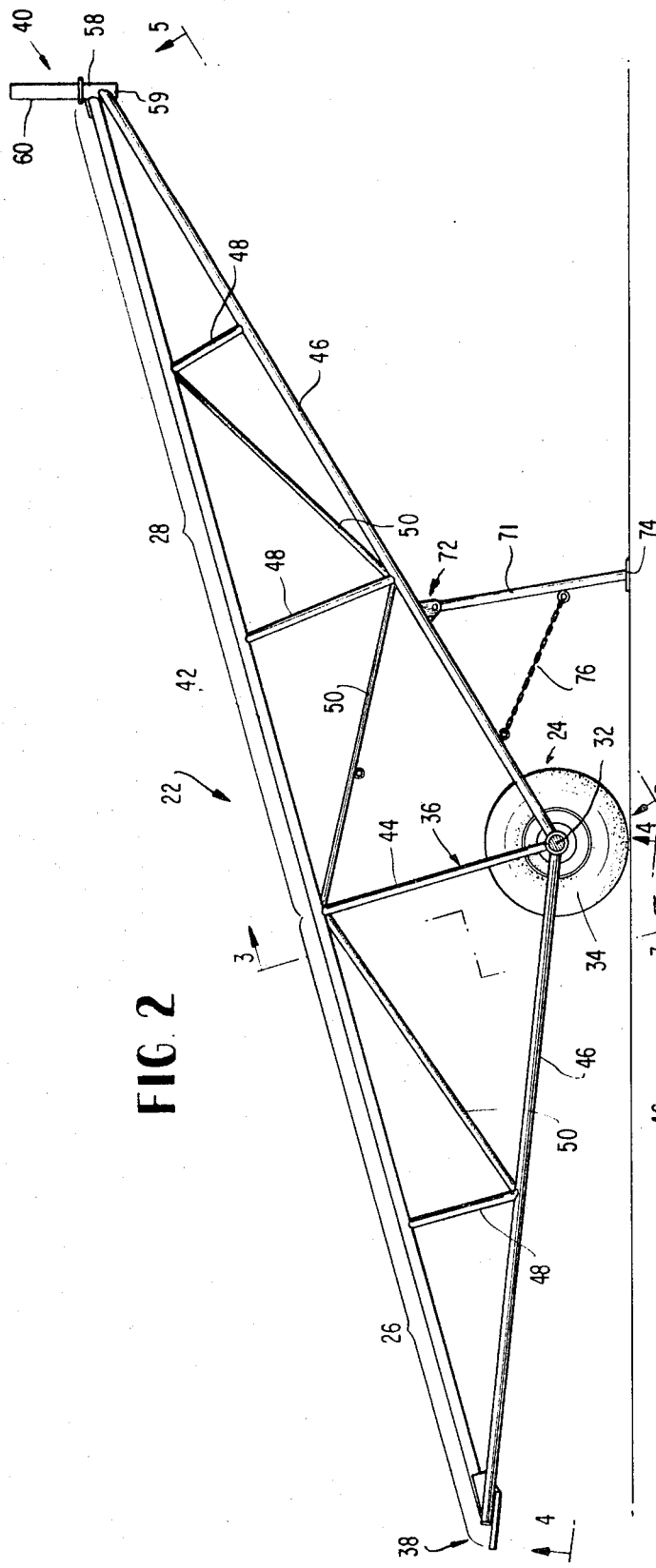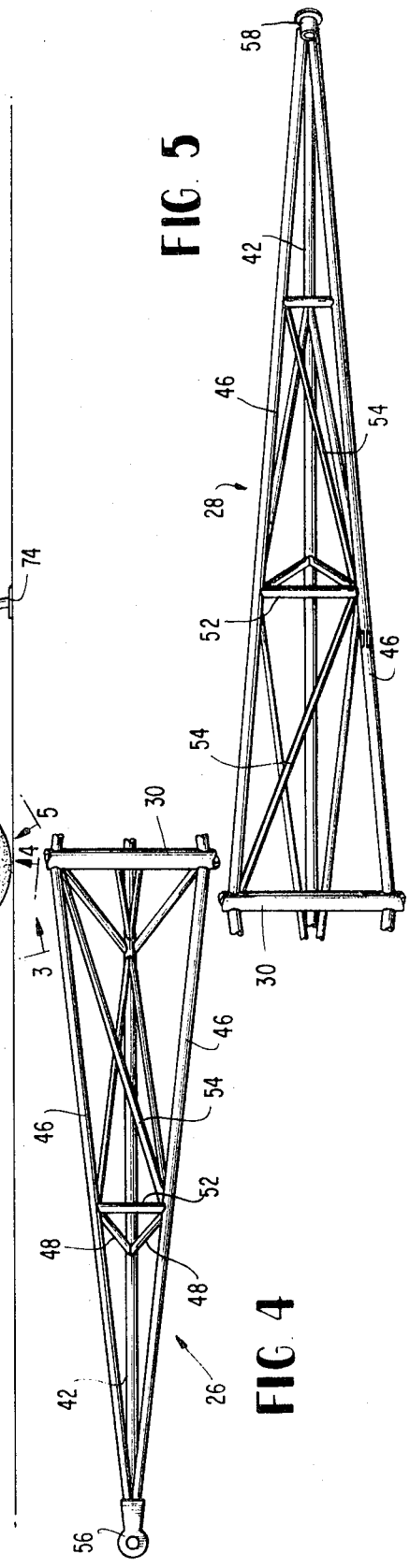

CRANE BOOM LOAD TRANSFER DOLLY

BACKGROUND OF THE INVENTION

This invention relates to the transfer of loads from a vehicle for supporting and transporting a crane, having an extended boom element, to a trailer or dolly. More particularly, this invention relates to a dolly cooperable with such a vehicle and with the transported boom element to transfer load from the vehicle rear axle to the dolly.

In the transportation of heavy equipment, such as cranes, having boom elements extending therefrom, a problem of crane and boom weight distribution on axles of the transporting vehicle is presented. State laws often dictate the maximum load which may be carried on particular axles of vehicles travelling on highways, and these laws often vary from state to state. As such, it often becomes desirable to provide for reducing the load carried by the axles of such vehicles, particularly in the case of a rear axle.

One approach to the weight distribution problem is that of the Whitmire U.S. Pat. No. 3,224,597. The Whitmire patent discloses a trailer attached by a tongue element to a tractor vehicle. The trailer is provided with two spaced wheeled axles, and the tongue is pivotally connected to both the tractor and the trailer. Through a cradle supported on the trailer and supporting a boom extending from the crane on the tractor, weight is transferred from the rear axle of the tractor to the trailer. A linkage system is provided to transfer weight from the front axle to the rear tractor axle.

Although such a device may be desirable for some purposes, it may not be entirely acceptable for a number of reasons. For example, the intricacy of the system and its inability to provide weight transfer to the trailer through the trailer tongue may not be satisfactory. Additionally, a fixed cradle connection between a boom and a dolly may be disadvantageous if the boom is inadvertently improperly positioned to support a portion of the dolly weight contrary to the purpose of the instant invention.

It would, therefore, be desirable to provide a relatively uncomplex system wherein transfer of load from the rear axle of a tractor to a trailer axle may be effectively accomplished through both the tractor connection and the boom element support of the trailer.

A relatively simple dolly structure has been previously utilized to transfer weight from the rear axle of a boom carrying vehicle. However, the dolly was fixedly attached to the boom and not attached to the vehicle.

It will be recognized that it would be desirable to retain such simplicity while realizing the advantages of attachment of the dolly to the vehicle with load transmission through that attachment. At the same time, accommodation for relative movement between the boom and the supporting dolly would be desirable to facilitate turning during travel conditions.

OBJECTS AND SUMMARY OF THE INVENTION

It is therefore a general object of the present invention to provide a novel trailer-type boom load transfer dolly for a crane supporting and transporting vehicle which is of relatively simple construction.

It is a particular object of the present invention to provide such a load transfer dolly wherein a load may be transferred to the dolly by a supported boom and through the connection of the dolly with the crane supporting vehicle.

It is another object of the present invention to provide such a transfer dolly for a crane supporting and transporting vehicle which is adapted to be easily connected and disconnected to the tractor and which provides for a relative movement of the boom with respect to its support on the dolly.

It is still another object of the present invention to provide a method of transferring load from a supported boom and a crane supported vehicle to a dolly connected to said vehicle and supporting said boom.

At least some of these objects are intended to be obtained by the provision of a trailer-type boom load transfer dolly which is of simple frame construction and is comprised of a fulcrum section including an axle supporting a plurality of ground-engaging wheels, a forwardly extending generally pyramidical truss section, and a rearwardly extending generally pyramidical truss section. The truss sections extend from the fulcrum section in generally opposite forward and rearward directions.

The forwardly extending, generally pyramidical truss section is provided with connecting means cooperable with a tractor to attach the dolly thereto. The rearwardly extending, generally pyramidical truss section is provided with a boom element supporting means. Both truss sections act as lever arms which pivot about the center line of the fulcrum section. When pivoted about the center line of the fulcrum section, the truss sections serve to respectively transmit load from the tractor and boom element to the axle of the fulcrum section.

The tractor connection may be in the form of a lug and clevis joint, or a ball and socket joint, or any other suitable connection which preferably will permit the transfer dolly to pivot horizontally relative to the tractor. The boom connection is preferably formed as a generally U-shaped saddle member pivotally mounted on the rearwardly extending truss section. The boom element is slidably received by the saddle member.

A pair of support legs, which when utilized will facilitate free support of the dolly as well as initial orientation of the transfer dolly relative to the tractor and boom, may be suitably connected to the rearwardly extending truss section.

BRIEF DESCRIPTION OF THE DRAWINGS

Other objects and advantages of the present invention will become apparent from the subsequent detailed description thereof in connection with the accompanying drawings in which:

FIG. 2 is a more enlarged elevational view of the trailer-type boom load transfer dolly of FIG. 1;

FIG. 4 is a view taken along line 4—4 of FIG. 2 and illustrating constructional details of the forwardly extending truss section of the transfer dolly;

FIG. 5 is a view taken along line 5—5 of FIG. 2 showing constructional details of the rearwardly extending truss section of the transfer dolly.

DETAILED DESCRIPTION OF THE PREFERRED EMBODIMENT

Figure 1:
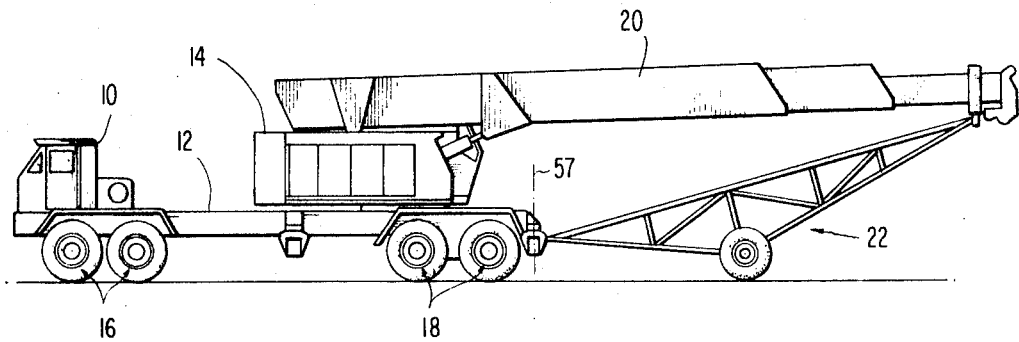
FIG. 1 is a side elevational representation of a tractor and dolly assembly embodying the principles of the present invention.

Referring more particularly to the drawings, wherein like parts are indicated by like numerals throughout, there is shown in FIG. 1 a vehicle assembly embodying the principles of the present invention. The vehicle assembly includes a tractor 10 having a flatbed 12 on which a crane 14 is supported for horizontal pivotal movement about a generally vertical axis, in a conventional manner. The tractor 10 is provided with front and rear dual wheeled axles indicated at 16 and 18 respectively.

Extending rearwardly from the crane 14 is a boom element 20, which is preferably of the extensible type. It should, however, be understood that other and different configurations of boom elements could be utilized.

A trailer-type, wheeled boom load transfer dolly 22 is pivotally connected to the tractor 10 generally at the rearward end of flatbed 12, and receives the boom element 20 in slidable relationship. The transfer dolly 22 functions to transfer a portion of the load from the rear axle assembly 18 of the tractor 10 to the transfer dolly axle 30.

With specific reference to FIGS. 2-6, a preferred form of the transfer dolly 22 may be seen to be configured essentially as a frame structure of unitary construction. The frame structure includes a fulcrum section 24, a forwardly extending truss section 26 and a rearwardly extending truss section 28 (FIG. 2). These truss sections 26 and 28 extend generally oppositely outwardly of the fulcrum section 24.

Figure 3:
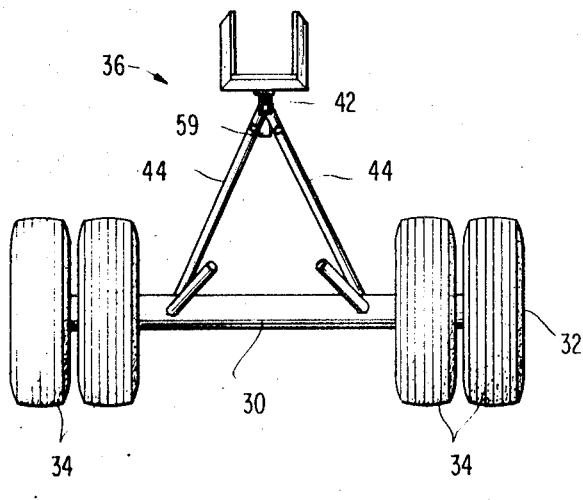
FIG. 3 is a view looking rearwardly along line 3—3 of FIG. 2 showing the fulcrum section and part of the rearwardly extending truss section of a transfer dolly of the present invention.
Figure 6:
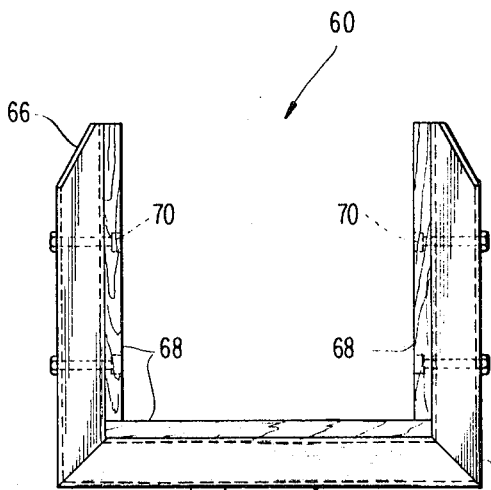
FIG. 6 is a view in elevation of the saddle element attachable to the dolly.

The fulcrum section 24 is comprised of a transverse tubular axle 30 and an equal plurality of wheels 34 mounted, in any conventional manner, on either end thereof (FIG. 3). The central axis, indicated at 32, of axle 30 serves as the axis about which the forwardly and rearwardly extending truss sections 26 and 28 may pivot.

The forwardly and rearwardly extending truss sections 26 and 28 may be generally triangularly pyramidical in shape, as illustrated. Together the forwardly and rearwardly extending, generally pyramidical truss sections 26 and 28 form a single span structure having a common base side 36 integrally connected with the axle 30. Truss sections 26 and 28 have connected at their apexes a tractor connecting means 38 and a boom element receiving and supporting means 40 respectively.

As shown in FIG. 3, the common base side 36 of the single span structure includes a pair of side brace tubes 44 connected to a top cord tube 42 and the transverse axle 30 in any convenient manner, as for examply by welding.

As may be seen in FIGS. 2, 4 and 5, each of the generally pyramidical truss sections 26 and 28 includes the generally straight top cord tube 42, as well as two bottom cord tubes 46. The bottom cord tubes 46 are suitably connected to the axle 30. It will be appreciated that in each of the truss sections 26 and 28, the top cord tube 42, the bottom cord tubes 46, the side brace tubes 44, and the axle 30 are generally triangularly oriented to define the generally triangularly pyramidical shape of the truss sections. Also included in the truss sections 26 and 28 are intermediate side brace tubes 48, side diagonal brace tubes 50, bottom brace tubes 52 and bottom diagonal brace tubes 54, which are interconnected in a network to complete the frame structure. The various tube connections may be made by any convenient means, as for example welding.

The bottom cord tubes 46 of the rearwardly extending truss section 28 and the forwardly extending truss section 26 extend generally upwardly at an angle on opposite sides of the common base 36. Preferably the length of the rear truss section 28 exceeds that of the forwardly extending truss section 26. As will be explained hereinafter, a multiplying effect with respect to the load transfer from the tractor 10 to the dolly 22 can be achieved according to the present invention.

The tractor connecting means 38 of the forwardly extending truss section 26 may be comprised of a lug 56 joined in any convenient manner, as for example by welding, with the free ends of the top cord tube 42 and the bottom cord tubes 46 forming the apex of the forwardly extending truss section 26. The lug 56 may be inserted into a clevis (not shown), located generally near the rearward end of the flatbed 12 and pinned thereto, to form a rigid pivotal connection defining a vertical axis 57 (shown in FIG. 1) about which the transfer dolly 22 may pivot with respect to the tractor 10. Alternatively, the connection can be of the ball and socket type, or any other suitable type of pivotal type connection to facilitate turning of the tractor 10 with respect to the dolly 22.

The boom element receiving and supporting means 40 of rearwardly extending truss section 28 may include a tubular sleeve portion 58 which joins in any conventional manner, as for example welding, with the free ends of the top cord tube 42 and the bottom cord tubes 46 to form the apex of the rearwardly extending truss section 28. A saddle member 60 is rotatably mounted within the tubular sleeve portion 58, to complete the assembly 40.

The saddle member 60 (FIG. 6) is preferably U-shaped and includes a tubular shaft 62 dimensioned for rotatable reception within the tubular sleeve 58. The U-shaped portion of the saddle may comprise a base wall 64 and side walls 66 formed integrally with the base wall 64 in a symmetrical fashion. The inner surfaces of the walls 64 and 66 may be lined with wood panels 68.

These panels 68 are secured to the respective walls by bolts 70. The bolts 70 have recessed heads so as not to interfere with the relative sliding motion of the boom element 20 within the U-shaped saddle member 60.

When assembled in the tubular sleeve 58, the saddle 60 is free to rotate about the vertical axis 59 (FIG. 2) of the sleeve 58, to thereby facilitate the relative sliding motion of the boom element 20 and the saddle member 60. Such relative sliding motion of the boom element 20 with respect to the saddle member 60 facilitates turning of the vehicle assembly during travel conditions.

If desired, the boom load transfer dolly 22 may be provided with a pair of support struts 71 (See FIG. 2). These struts 70 are respectively pivotally connected, as indicated at 72, to one or each of the bottom cord tubes 46 of the rearwardly extending truss section 28. The struts 71 may be provided with a plate 74 for ground engagement. A chain 76 is connected between each of the bottom cord tubes 46 of the rearwardly extending truss section 28 and the struts 71.

The connections to each of the bottom cord tubes 46 are forwardly of the pivotal connection 72, to thereby establish a limiting outwardly pivoted position of each of the struts 71 relative to the bottom cord tubes 46. When the struts 71 are in ground engagement, the connecting means 38 and the support means 40 may be positioned at their optimum levels for connecting to the tractor portion 10 and supporting reception of the boom element 20 respectively.

When the vehicle combination is assembled, as shown in FIG. 1, the overhanging portion of the boom element 20, i.e., the boom portion extending from the crane 14 to beyond the saddle 60 supporting the boom, will apply weight to the transfer dolly 22 through the saddle 60. The forwardly extending truss section 26 and the rearwardly extending truss section 28 of the dolly 22 act as lever arms which tend to pivot clockwise (as viewed in FIG. 1) about the axis 32 of fulcrum section 24.

Boom support weight is transmitted from the rear tractor axle assembly 18 to the dolly axle 30 through the rearwardly extending truss section 28. Also, the force applied to the dolly 22 by means of the support of the boom 20 in the saddle 60 exerts a turning moment (clockwise as viewed in FIG. 1) on the truss section 28 about the axis 32. This moment results in an upwardly directed force through the rigid connecting means 38 to the flat-bed 12 of the tractor 10. The magnitude of the force will depend on the relative longitudinal dimensions of the forward and rearwardly extending truss sections 26 and 28 of the dolly 22. In any event, this upwardly directed force is reacted against by the tractor 10.

It should be noted that maximum load transfer can be achieved when both the saddle 60 and fulcrum section 24 are positioned between the vertical axis 57 passing through the connecting means shown in FIG. 1 and the center of gravity of the boom 20. In such case, load is removed from the rear flatbed axles by lifting action placed on both the flatbed 12 and crane 14 by the dolly 22 and boom 20 in an amount corresponding to the weight of the boom multiplied by the respective lever arms.

From the foregoing, it will be appreciated that load is transmitted from the rear tractor axle assembly 18 to the dolly axle 30 through both the forwardly extending truss section 26 and the rearwardly extending truss section 28, with very small weight addition to the tractor axle assembly 16. The amount of weight so transferred can be selected by proper selection of the relative lengths of the lever arm truss sections 26 and 28. The result is a more uniform distribution of the crane and boom load throughout the supporting structures, namely, the tractor 10 and the trailer-type transfer dolly portion 22.

By providing the saddle 60 with a pivotal capability with respect to the pivotally connected transfer dolly 22, and by providing that the boom element 20 can slide longitudinally with respect to the saddle 60, all necessary turning of the vehicle assembly during transportation may be accommodated.

SUMMARY OF ADVANTAGES

Thus, it may be seen that in following the present invention, a crane supporting and transporting vehicle combination is provided wherein the axle of a single axle wheeled transfer dolly functions to relieve load on the rear axle of a tractor through two load transmitting lever sections, one of which supports an overhanging boom element, and the other of which is releasably and pivotally connected to the tractor.

Of particular significance is the provision of such a boom load transfer dolly which is configured essentially as a frame structure of generally unitary construction and which may be relatively inexpensive to fabricate.

Another fact of significance is the provision of the transfer dolly with a boom element supporting and receiving saddle which may be easily fabricated and accommodates sliding movement of the boom element when the tractor of the vehicle assembly is caused to turn relative to the dolly.

Although the present invention has been described in connection with one preferred and illustrated embodiment, it will be appreciated by those skilled in the art that additions, modifications, substitutions and deletions not specifically described may be made without departing from the spirit and scope of the invention as defined in the appended claims.

What is claimed is:

1. A crane boom load transfer dolly for use with a multiple axle crane supporting and transporting tractor vehicle from which a crane boom extends, comprising:
    a fulcrum section including a wheel supporting dolly axle;
    first and second lever arm load transmitting sections extending generally oppositely outwardly from said fulcrum section and pivotable together thereabout;
    said first and second lever arm load transmitting sections comprising a rigid assembly of unitary construction, said rigid assembly being pivotable about said fulcrum section;
    said first lever arm load transmitting section including means adjacent one end thereof for pivotally connecting said dolly adjacent the rear of said tractor vehicle with said first lever section in load transmitting relationship between the rear portion of said tractor vehicle and said dolly axle; and
    said second lever arm load transmitting section including means for slidably receiving and supporting said crane boom, with said second lever section being in load transmitting relationship between said boom and said dolly axle.

2. The crane boom load transfer dolly of claim 1, wherein:
    said first and second lever arm, load transmitting sections are respectively comprised of first and second pyramidical truss sections extending generally oppositely outwardly from said fulcrum section; and wherein:
    said means for pivotally connecting said dolly to said tractor vehicle and said means for slidably receiving and supporting said crane boom are disposed generally at the apexes of said truss sections.

3. The crane boom load transfer dolly of claim 2, wherein said fulcrum section and said generally pyramidical truss sections are formed as a frame structure of unitary construction.

4. The crane boom load transfer dolly of claim 2, wherein said means for slidably receiving and supporting said boom includes a generally U-shaped saddle member pivotally supported on said second truss section.

5. The crane boom load transfer dolly of claim 1, further comprising ground engageable dolly support means pivotally connected to one of said lever arm, load transmitting sections.

6. A vehicle assembly for supporting and transporting a crane having a main body and a boom extending therefrom comprising:
   a multiple axle, wheeled tractor on which said main body is supported, for generally horizontal pivotal movement; and
   a wheeled boom load transfer dolly, said transfer dolly including:
   a fulcrum section having wheel supporting axle means, and
   two lever arm load transmitting sections,
   one of said lever arm load transmitting sections being pivotally connected to said wheeled tractor, and the other of said sections supporting said boom extension,
   said load transmitting sections being pivotable about said fulcrum section to transfer load from said tractor to said wheel supporting axle means through both said lever arms.

7. The vehicle assembly of claim 6, wherein:
   one of said lever arm load transmitting sections is formed as a forwardly extending, generally pyramidical truss, and the other of said lever arm load transmitting sections is formed as a rearwardly extending, generally pyramidical truss, and wherein:
   connecting means is disposed at the apex of said forwardly extending truss for pivotally connecting said transfer device to said tractor, and boom support and receiving means is disposed at the apex of said rearwardly extending truss.

8. The vehicle of claim 7, wherein said fulcrum section, said forwardly extending generally pyramidical truss and said rearwardly extending generally pyramidical truss are formed as a frame structure of unitary construction.

9. The vehicle of claim 7, wherein said boom support and receiving means includes a generally U-shaped saddle member pivotally mounted on said rearwardly extending truss.

10. The vehicle of claim 6, in which said transfer dolly further includes transfer dolly support means pivotally connected to one of said lever arm load transmitting sections.

11. In a vehicle assembly for supporting and transporting a crane having a main body and a boom extending therefrom including a multiple axle wheeled tractor and a boom load transfer dolly wherein said transfer dolly is comprised of a fulcrum section having wheel supporting axle means and two generally forwardly and rearwardly extending lever arms extending therefrom, the method of transferring load from said tractor to said dolly comprising:
   connecting said forwardly extending lever arm to said tractor; and
   receiving and supporting said boom extension on said rearwardly extending lever arm:
   to apply a turning movement to said transfer dolly about said fulcrum section, thereby tending to pivot said transfer dolly, and
   to place said forwardly and rearwardly extending lever arms in load transmitting relationship between said dolly axle and said tractor and said boom respectively.

12. A crane boom load transfer dolly for use with a multiple-axle crane supporting and transporting tractor vehicle from which a crane boom extends, comprising:
   a wheeled dolly including a fulcrum section;
   a load transmitting section operatively associated with said fulcrum section and including a first portion extending from said fulcrum section;
   said first portion including means adjacent one end thereof for pivotally connecting said dolly adjacent the rear of said tractor vehicle with said first portion in load transmitting relationship between said rear of said tractor vehicle and said dolly; and
   means on said load transmitting section for freely slidably abutting and supporting said crane boom, in load transmitting relationship between said boom and said dolly, said means having an upward facing saddle means for permitting a disengagement of said crane boom from said means by a lifting upward of said crane boom.

13. In a crane transporting assembly for supporting and transporting a crane including a multiple-axle wheeled tractor and a boom extending therefrom;
   the improvement comprising, in combination with said crane;
   a wheeled boom load transfer dolly of unitary construction and pivotally connected to said tractor for reducing the load on the tractor wheels, said transfer dolly including:
   a wheeled dolly including a fulcrum section in load transmitting relationship with said boom and said wheeled dolly, said fulcrum section being operative between the boom center of gravity and said wheeled tractor and including means for slidably abutting and supporting said boom whereby said boom is freely elevatable out of contact with said transfer dolly.

* * * * *